(12) United States Patent
Crow et al.

(10) Patent No.: US 8,904,363 B2
(45) Date of Patent: Dec. 2, 2014

(54) PROJECTING SOFTWARE AND DATA ONTO CLIENT

(75) Inventors: Howard M. Crow, Sammamish, WA (US); Ricard Roma-Dalfo, Redmond, WA (US); Mohammed Nazeeruddin, Bellevue, WA (US); Targo Tennisberg, Redmond, WA (US); Arshish C. Kapadia, Issaquah, WA (US); Wei-Lun Lo, Issaquah, WA (US); Jiajun Hua, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1125 days.

(21) Appl. No.: 12/147,869

(22) Filed: Jun. 27, 2008

(65) Prior Publication Data
US 2009/0328032 A1   Dec. 31, 2009

(51) Int. Cl.
G06F 9/44 (2006.01)
G06F 9/45 (2006.01)

(52) U.S. Cl.
CPC ....................... *G06F 8/52* (2013.01)
USPC ............ 717/136; 717/120; 717/176; 717/102

(58) Field of Classification Search
USPC .................. 717/102, 120, 176, 136
See application file for complete search history.

(56) References Cited

U.S. PATENT DOCUMENTS

| | | | |
|---|---|---|---|
| 6,041,362 A | 3/2000 | Mears et al. | 709/300 |
| 6,785,721 B1 | 8/2004 | Immerman et al. | 709/220 |
| 7,188,112 B1 | 3/2007 | Lindquist et al. | 707/10 |
| 2004/0024843 A1 | 2/2004 | Smith | 709/219 |
| 2004/0111727 A1 | 6/2004 | Schwarzbauer et al. | 719/310 |
| 2005/0010550 A1* | 1/2005 | Potter et al. | 707/1 |
| 2005/0050228 A1 | 3/2005 | Perham et al. | 709/246 |
| 2006/0069714 A1 | 3/2006 | Blount et al. | 709/203 |
| 2006/0195476 A1* | 8/2006 | Nori et al. | 707/104.1 |
| 2006/0259544 A1 | 11/2006 | Zubenko et al. | 709/203 |
| 2007/0260629 A1* | 11/2007 | Tseitlin et al. | 707/102 |
| 2009/0171679 A1* | 7/2009 | Salgado et al. | 705/1 |
| 2009/0254912 A1* | 10/2009 | Roundtree et al. | 718/102 |

OTHER PUBLICATIONS

Chang, et al., *Towards Context-Aware Web Applications*, [Internet], University of Illinois at Urbana-Champaign, IFIP International Federation for Information Processing 2007, pp. 239-252. http://osl.cs.uiuc.edu/docs/DAIS07/45310239.pdf.

Lum, et al., *A Context-Aware Decision Engine for Content Application*, [Internet], Pervasive Computing, Jul.-Sep. 2002 IEEE, pp. 41-49.   http://ieeexplore.ieee.org/iel5/7756/22254/01037721.pdf?isNumber=.

Sanghvi, et al., *Integration of Smart Client Applications with Existing Web Applications*, [Internet], 7 pp. http://www.codeproject.com/smartclient/SmartDemo.asp, printed Aug. 29, 2007. http://www.codeproject.com/smartclient/SmartDemo.asp.

* cited by examiner

*Primary Examiner* — Li B Zhen
*Assistant Examiner* — Duy Khuong Nguyen
(74) *Attorney, Agent, or Firm* — Tom Wong; Jim Ross; Micky Minhas

(57) ABSTRACT

A software application written for a server environment is transformed into one which runs in a rich client environment. An entity model defines data sources as they are accessed from the server and as they are accessed from the clients. An application programming interface defines stereotyped interfaces which provide the same functionality on the server and the clients. A metadata model describes the components which make up the application and defines the differences in structure between the server and clients. The metadata model also defines mappings between components used on the server and clients. Settings and context information which tailor the activation and functionality of the components is also captured in the metadata model. Automated transformation is performed by using the mappings to identify the component set to use for the clients, selecting the client version of the application programming interfaces, and selecting the appropriate settings and context information.

20 Claims, 4 Drawing Sheets

PROJECTING SOFTWARE AND DATA ONTO CLIENT

BACKGROUND

Business rules are increasingly being captured in web based applications. The complex data stores on which these applications rely are typically hosted on database server systems. The resulting combination is a server-centric set of solutions.

In parallel, rich client applications have become the toolset used to perform the daily tasks of the business workers. These rich client applications are becoming well integrated with each other, raising expectations of seamless integration between business solutions.

Integration of rich client applications with server based business systems is not as seamless as between client applications. Users must switch between systems and between styles of user interaction in order to perform related tasks.

Solutions which allow the users to interact with the server based business systems from within the rich client environment would increase user satisfaction and productivity. Supporting that interaction from multiple client applications would provided added benefit.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Various aspects of the subject matter disclosed herein are related to the automated transformation of a software application which runs on a server system into one which runs on one or more rich client applications. Stereotyped APIs, abstract models of data sources, and metadata models of the application support the transformation.

Other aspects relate to mapping components and their properties from the server to the clients. Some components and properties exist in both environments. Others have equivalents which can be substituted. Still others are distinct and will only be used in a subset of the environments.

Still other aspects relate to modeling and transforming settings which control the behavior of components and context information which controls the timing and conditions under which user interface components will be activated or displayed.

The approach described below may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the above summary can be obtained by reference to the accompanying drawings, which are briefly summarized below, to the following detailed description of present embodiments, and to the appended claims.

DETAILED DESCRIPTION

This detailed description is made with reference to the accompanying drawings, which form a part hereof, and which show, by way of illustration, specific exemplary embodiments. These embodiments are described in sufficient detail to enable those skilled in the art to practice what is taught below, and it is to be understood that other embodiments may be utilized and that logical, mechanical, electrical, and other changes may be made without departing from the spirit or scope of the subject matter. The following detailed description is, therefore, not to be taken in a limiting sense, and its scope is defined only by the appended claims.

Figure 1:
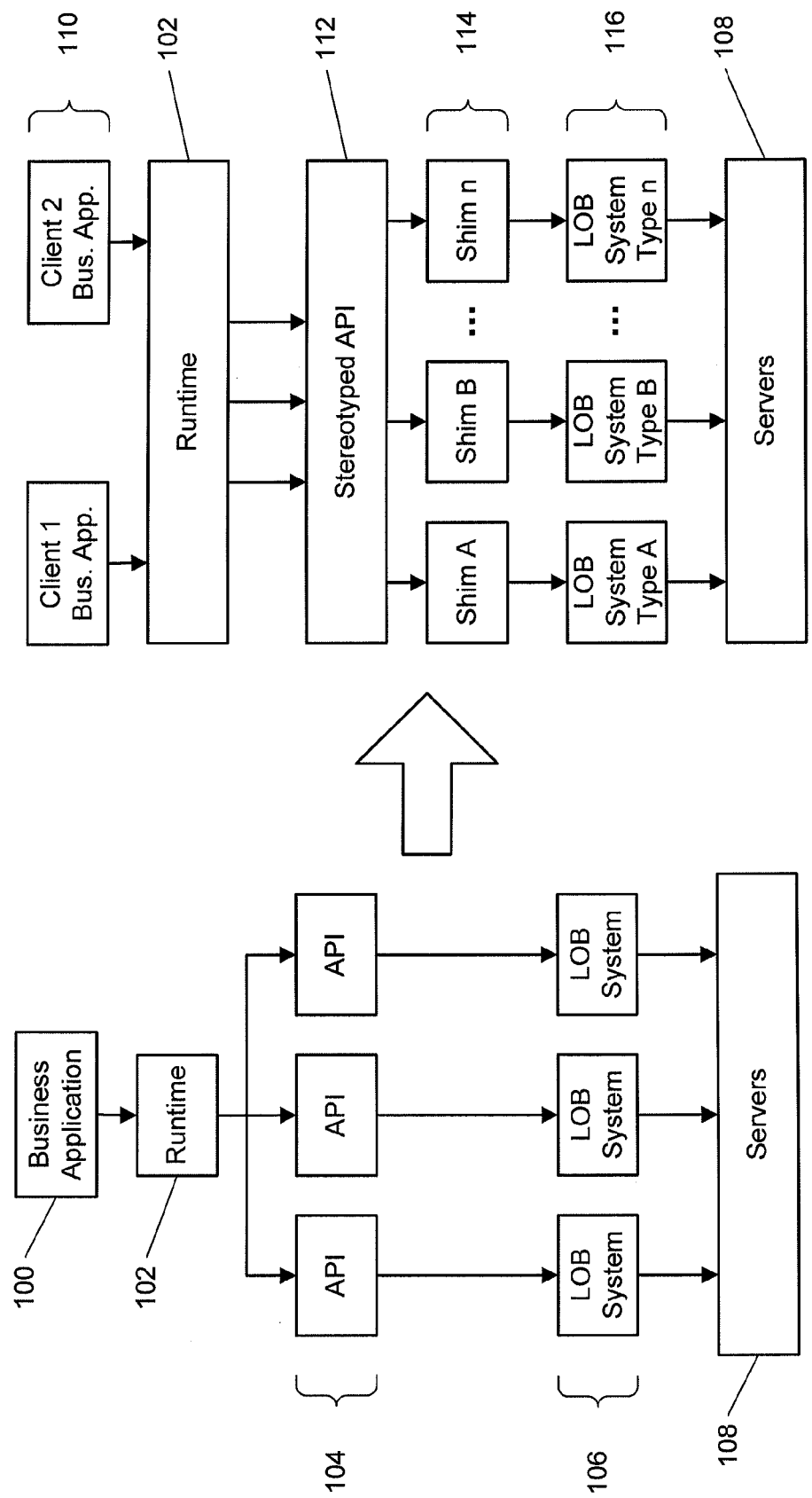
FIG. 1 is a block diagram illustrating the transformation of a server application into client applications.

The present disclosure addresses the transformation of a software application written for one system environment into one capable of execution on another. Referring to FIG. 1, a Business Application 100 is illustrated which has been developed for an exemplary system comprising those components below it. The Runtime component 102 provides a set of services applicable across a variety of applications. The Runtime 102 relies, in turn, on the Application Program Interfaces (APIs) 104 which provide access to Line Of Business (LOB) systems 106. These LOB systems are external and are typically focused on providing a specific type of service. They often comprise business logic operating on a persistent store of data maintained on a server 108. As an example, they may provide access to a business entities data (i.e., payroll, production, etc.) stored in a relational database; to external data sources (i.e., RSS feeds); or to specialized services such as web hosting. An exemplary architecture would host the LOB systems 106 on one or more servers 108.

An exemplary approach to the above transformation of a Business Application 100 emphasizes automatically transforming an application developed to run in a server environment to run on one or more client environments. In the present disclosure a "client" is a software application (such as a word processor) and its associated components, not a hardware client as the term is sometimes used. This exemplary approach relies on having an environment in which the Runtime component 102 provides identical functionality on both client and server. This can be achieved by abstracting the system specific APIs 104 and creating a stereotyped API 112 which provides a simple, orthogonal, set of commonly used operations that are supported by the set of LOB Systems 106. This stereotyped API 112 may then utilize a set of shims 114, or connectors, to translate the abstract requests into system specific invocations. For each different LOB System Type 116 the associated shim provides system specific code that implements the API. The shims 114 also serve to wrap the system specific data returned by the LOB Systems 106 to provide a uniform, stereotyped interface to the data.

The present disclosure is specific to the transformation of a Business Application 100 into one or more Client Business Applications 110 within the context of an exemplary environment such as that described above and illustrated in FIG. 1. The details of that environment are beyond the scope of the present disclosure and will be discussed only as necessary for the purposes of this disclosure.

Figure 2:
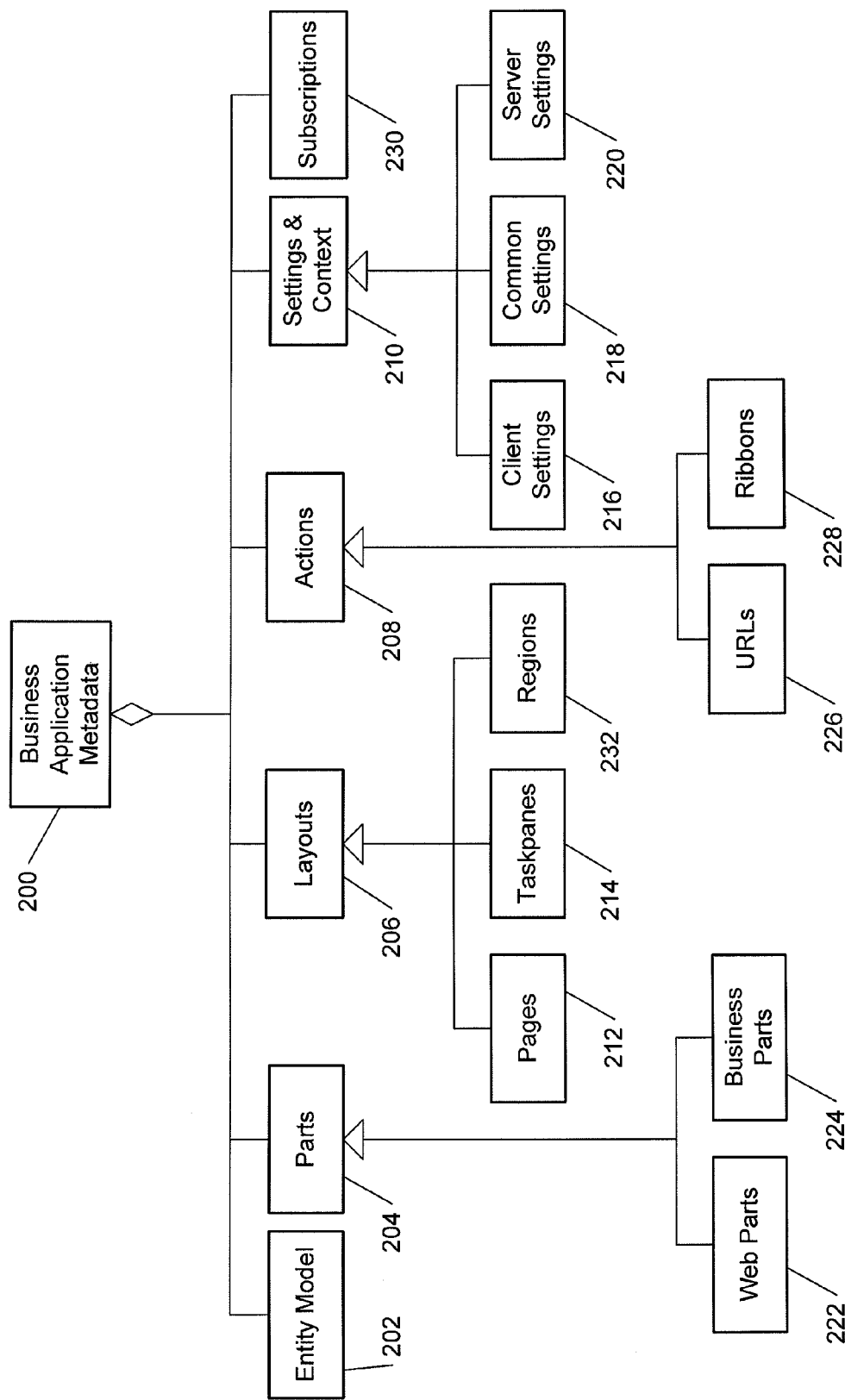
FIG. 2 is a class diagram of an exemplary metadata model of a business application.

Central to the concepts of the present disclosure is a Business Application Metadata model 200 such as that illustrated in FIG. 2. Specifying a combination of one or more of the components of the metadata model 200 defines an abstract model of the Business Application 100. This model can then be instantiated to form a concrete, executable application. The concepts of the present invention allow multiple instantiations to be formed, targeted to different environments, such as the Client Business Applications 110. Each instantiated application will then provide the same functionality in each environment.

An exemplary embodiment uses the components illustrated in FIG. 2 to model a Business Application 100. Parts 204 and Layouts 206 represent aspects of the Graphical User Interface (GUI) of the application. Actions 208 expose functionality for use. They may also have an aspect which surfaces in the GUI where a graphical control is use to trigger the functionality. Settings and Context information 210 represent attributes or properties which control the operation of the other components; tailor the operation of business rules; or otherwise customize the Business Application 100. The Entity Model 202 describe the various LOB Systems 106 available to the Business Application 100. Of particular interest are those external systems which serve as data sources. The Entity Model 202 describes essential characteristics of each system such as its API, data interchange formats, and authentication methods.

The exemplary embodiment of FIG. 2 decomposes some or all of the components into subclasses. In some cases, such as for Parts 204 the subclasses are specific to a particular type of environment. Web Parts 222 are specifically applicable to a server based application which is accessed via a web browser. Business Parts 224 are applicable to Client Business Applications 110 which are accessed directly. In other cases, such as Layouts 206 the top level class may be applicable to all environments (i.e. the layout engine for all environments understands the same basic information for laying out GUI elements) while the subclasses each provide a host specific implementation on which a layout can be displayed. Pages 212 provide two dimensional layout capabilities while Taskpanes 214 are limited to one dimensional layout. Other display surfaces such as regions 232 are more specific to a particular rich client. These components will differ in appearance while providing the same underlying functionality. Similarly the subclasses of Actions 208 will provide equivalent functionality even though they look different and require different user interaction. URLs 226 serve as hyperlinks to destination web pages or other landing sites. They offer the flexibility of being able to be embedded within pages and documents. Ribbons 228 implement a specific model of presenting buttons within a bounded area. Settings and Context 210 have been decomposed in to three discrete sub-classes: Client Settings 216 are unique to client hosted applications; Server settings 220 are unique to server hosted applications; while Common Settings 218 are applicable to both client and server hosted applications.

The exemplary component model illustrated in FIG. 2 is only one possible embodiment. Clearly additional, or different, subclasses could be used as could a different top-level partitioning.

Figure 6:
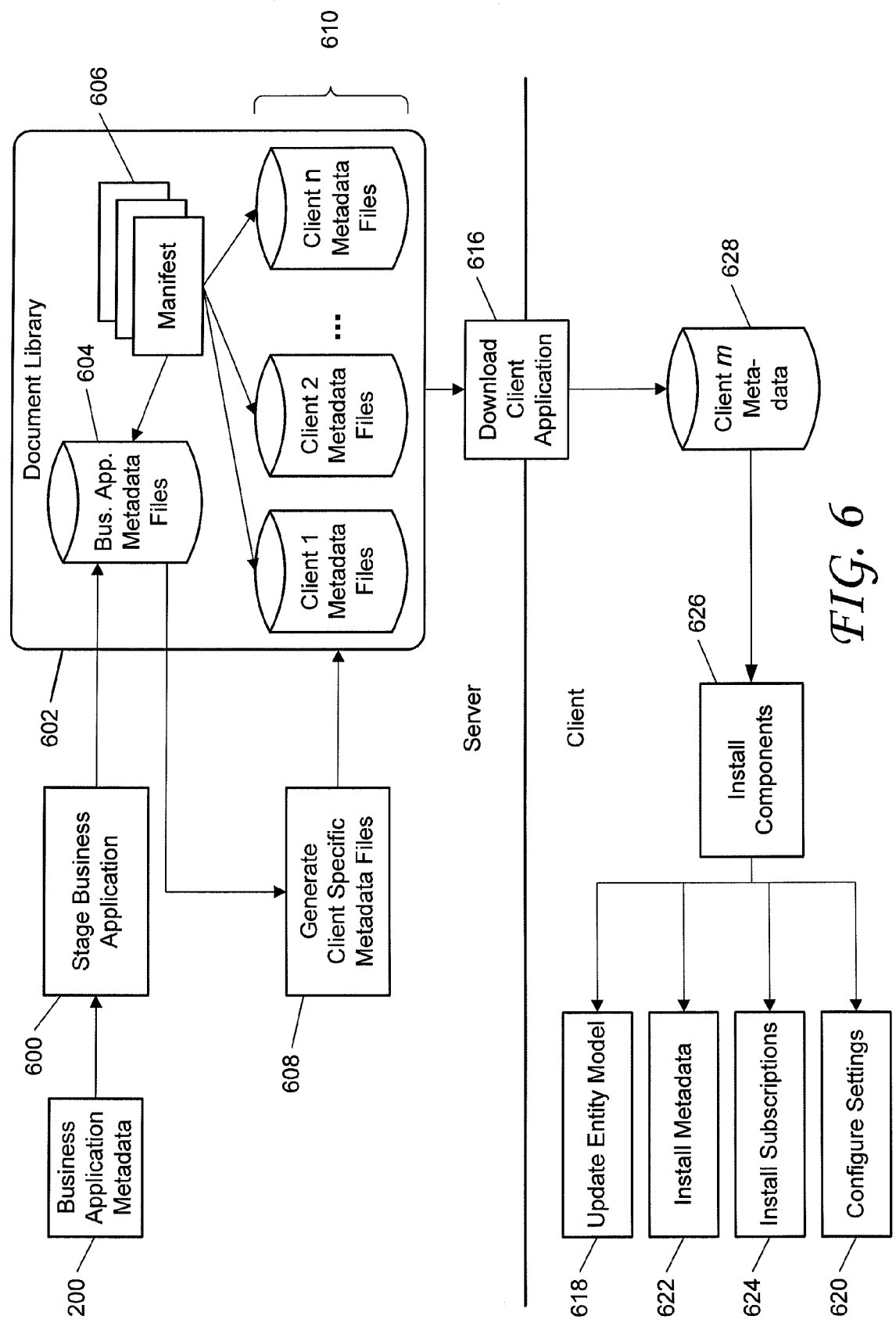
FIG. 6 illustrates the process of transforming an application from server to client.

The high level process of transforming a Business Application 100 from the server into a Client Business Application 110 is illustrated in FIG. 6. The Business Application Metadata 200 (see FIG. 2) is created as the application is being built on the server. When implementation is complete, the developer will Stage the Business Application 600 by placing the metadata into the Document Library 602. A Manifest 606 lists the components of the Business Application 100 as implemented on the server. The Business Application Metadata Files 604 then serve as the source data for the transformation process. Step 608 Generate Client Specific Metadata files reads in the Business Application Metadata Files 604 and generates the Client Metadata Files 610. Each set of client metadata is specific to a particular client environment and a separate Manifest 606 lists the components to be transformed (or generated) for each client. An exemplary embodiment uses XML files to implement the Client Metadata Files 610. When triggered, by a user or an automated event, Download Client Application 616 will select the appropriate set of Client Metadata Files 610 and transfer them to a client computer as local Client Metadata 628. Install Components 626 will then unpackage the metadata and install the components locally. Update Entity Model 618 will update the local copy of the Entity Model 202 (see FIG. 2) to reflect any additions or changes required for the applications being installed. Install Metadata 622 installs the application specific metadata, configuring the components instances as they are installed. Install Subscriptions 624 establishes the data subscriptions which the application components will use to retrieve data from the sources defined in the Entity Model 202. Configure Settings 620 applies the Context and Settings data 210 to tailor the behavior of the components as required.

The transformation of a Business Application 100 from the server into a Client Business Application 110 involves mapping the server model of the application into the client model of the application. Three of the components play lead roles in this process. The Entity Model 202, which describes the data sources and their APIs, captures the differences between the runtime environment on the server and on the rich client and servers as the framework for the transformation. The Layouts 206 are the top level UI components and can be viewed as containers for all of the other UI components which are to be transformed. The Settings and Context 210 describe the bindings between the Entity Model 202 and the UI components.

The transformation of the Entity Model 202 starts by identifying those LOB systems with which the Business Application 100 interacts. This can be determined by identifying the data sources for each UI component being used. For each of these the Entity Model 202 provides access information for the server and for the rich clients. The transformation process selects the access method which is appropriate for accessing each data source from the selected rich client. Because these access methods will be remote, authentication methods will also be selected which may not have been needed on the server. Some of the settings which comprise the Settings and Context 210 capture attributes of these access methods. Because the Entity Model 202 contains representations of the LOB systems from both server and client perspectives, most of this transformation involves looking up the system and selecting the values appropriate to the client. In some cases there may be multiple options available on the client. For example, there may be more than one authentication method available. In these cases the preferred method may have been previously identified, enabling automatic selection or the alternatives may be presented to the user and their choice retrieved.

In an exemplary embodiment the UI components are transformed in a hierarchical process starting at the Layout 206 and working down to the smaller components. The Layout itself describes the relative arrangement of UI components in the graphical display which is presented to the user. The layout engines on the client and server are different but each can consume a Layout 206. While the same functional capabilities are available on both the server and the client, the visual presentation of the components may differ significantly. For example, the server may utilize Pages 212 which support two dimensional arrangements while a client may only support a Taskpane 214 which supports only one dimensional arrangement. An exemplary embodiment supports three options for transforming layouts. In the first, the existing server layout is automatically transformed into the client equivalent. As a part of this, two dimensional arrangements will be mapped to one dimensional arrangements according to specified rules. A second alternative is to generate a layout from the information available in the entity model and the specification of the Business Application 100. Predefined rules will be applied to provide default positioning of the components. A third alternative is for the user to develop a separate layout which is specific to the client. Once this layout is defined and the mappings between parts specified by the user, the transformation can subsequently be performed automatically by transferring properties and settings for the individual parts as described below. Context 210 information for the Layout 206 will also be transformed for use in the client specification. The context information controls when the layout is displayed. This may be the same as for the server or it may be different. Where the information is the same, it will be mapped directly to the client. Where the context information differs or where the developer wants different behavior, mappings between the server context information and the client context information will be specified and the server settings mapped to the equivalent client settings.

Figure 4:
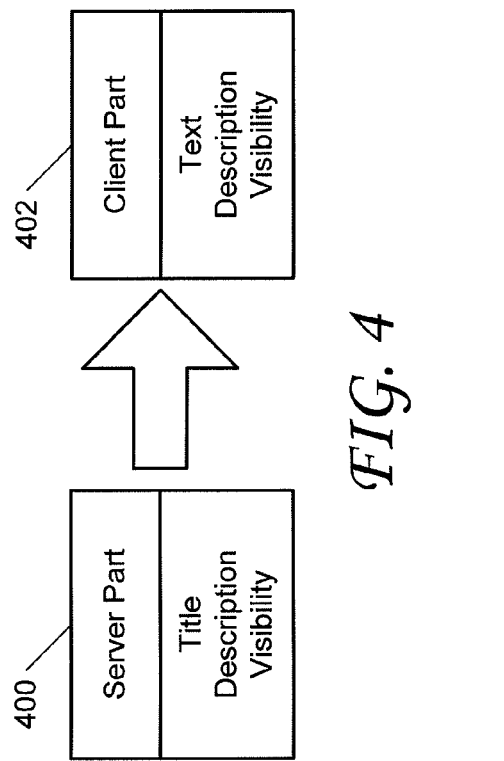
FIG. 4 illustrates the transformation of a part having an equivalent property.
Figure 5:
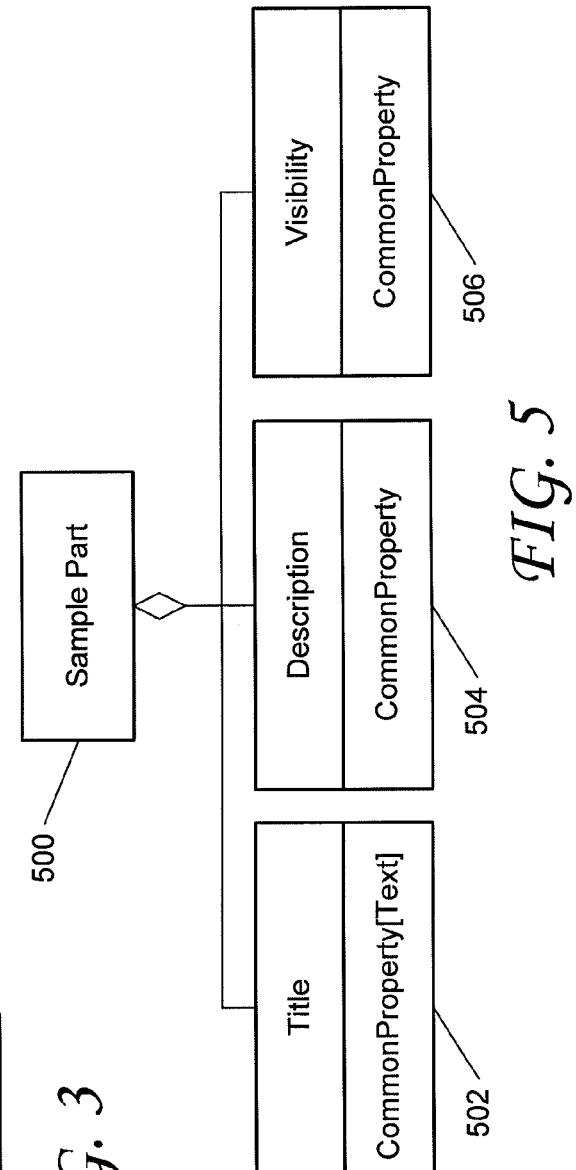
FIG. 5 is a class diagram of a part having identical and equivalent properties.
Figure 3:
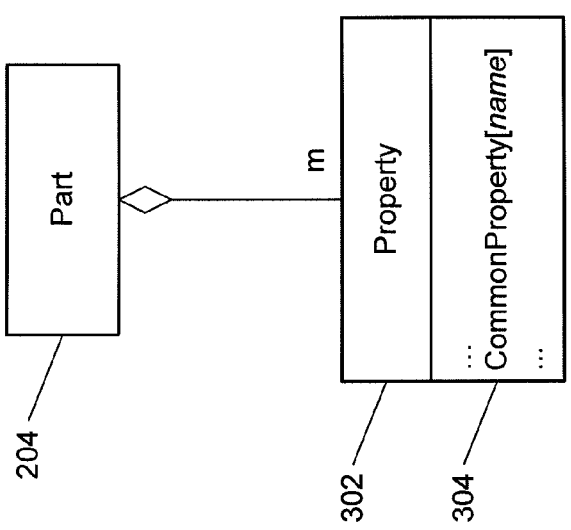
FIG. 3 is a simplified class diagram of an exemplary implementation of a part.

Contained within Layouts 206 are Parts 204. On the server Web Parts 222 are used to implement the user interface. The equivalent capability is handled by Business Parts 224 on the Rich Client. The transformation of Parts 204 is more complex due to the differences in how the user interface is handled on the server and clients. Referring to FIG. 3 a greatly simplified exemplary embodiment of a Part 204 is illustrated. In addition to other attributes, each component comprises plural Properties 302 each of which describes a particular aspect of the component. Each Property 302 has plural attributes 304 which define a particular characteristic of that Property 302. In the exemplary embodiment, each Property 302 has an Attribute 304 named CommonProperty which is used to identify those Properties which are common across the host environments. The optional "name" parameter on the attribute can be used to specify a different name in the target version. FIG. 4 illustrates a trivial mapping of a server part 400 to a Client Part 402 while FIG. 5 shows the corresponding metadata specification for a Sample Part 500. The Server Part 400 has three Properties 302: Title, Description, and Visibility. The Client Part 402 shares the use of Description and Visibility but uses Text in place of Title. Referring to FIG. 5 these features are reflected in the model of the Sample Part 500. Description 504 and Visibility 506 have the attribute CommonProperty with no name parameter indicating that the property is used on both the server and client versions with the same name. Title 502 has the CommonProperty attribute with a parameter of "Text" to indicate that Title is used on the client but with a different name. This approach supports automated mapping of components by enabling direct transfer of attributes which are identical or equivalent. Any Property with the CommonProperty attribute can be automatically mapped. Where the CommonProperty attribute is not present, the Part will not be transformed for use on the client. This same approach is easily extended to other Components. Business Parts 224 may also be specified which are not directly mapped from Web Parts 222. These will be included in the Client Business Application 110 during transformation.

As the Parts 204 are transformed, associated data sources are identified. A Business Application 100 which is running on a server can connect to these data sources in real time. In the client environment support is also needed for disconnected operation, where the computer has no network connection. Since the data sources are server based the Business Application 100 cannot access them without a network connection. An exemplary solution to this is to use local caching of the data sources with subscriptions to update the data when the network connection is available. In this model, Subscriptions 230 are exclusive to the Client versions of applications and do not exist on the Server side. As each unique data source is identified during the transformation process, subscriptions are automatically generated by reference to the Entity Model 202.

Actions 208 may be associated with either an entity class or with a particular instance. On the server, actions are typically implemented as code, workflows or URL based navigation options. Code based actions can be used on the client as long as the code has been exposed. The UI control used to activate the Action 208 will be mapped to an equivalent control on the client. Workflows can be handled in the same manner if a compatible workflow engine is available on the client. Otherwise they will not be available on the client. URL links are not directly supported on the client because the clients do not use a web browser paradigm. The transformation process converts URL based Actions 208 to an equivalent user experience. The hyper link is replaced with a button or other UI control. The destination Page 212 is replaced with a Taskpane 214 or Region 232.

Throughout the transformation process the Settings and Context 210 data associated with each of the components is transferred to the Client Metadata files 610 along with the transformed component. This information comprises criteria and conditions which specify when a component will be displayed, activated, or otherwise enabled. For example, a particular Action 208 may only be enabled when the user is working on a Microsoft Word document that was created from a template named "Resume." A different Action 208 may be enabled for a Microsoft Excel spreadsheet with the custom property "Group" set to "Accounting." Some Settings and Context 210 data is common to both server and client and the transformation consists of directly copying it to the client specification. In other cases there will be an equivalent which has been defined and that data will be substituted. It is also possible for client-specific Settings and Context 210 data to be specified by the developer. That data will be added to the client metadata as part of the transformation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method of transforming a software application from a server environment to a client environment, the method comprising:

providing an entity model which defines a plurality of data sources;

providing an application programming interface comprising stereotyped interfaces to the plurality of data sources defined by the entity model;

creating a server instance of the software application comprising a plurality of components, at least one of which accesses data stored in the plurality of data sources by utilizing a server instantiation of the stereotyped interfaces;

creating a server metadata model of the server instance of the software application, the server metadata model comprising settings and context data to which the at least one component of the server instance of the software application is responsive;

creating a plurality of client metadata models for a plurality of client instances of the software application, each of the plurality of the client metadata models comprising:

mapping the plurality of components in the server metadata model to a plurality of components in each of the client metadata models;

providing settings and context data to which at least one component of a client application will be responsive; and mapping the settings and context data in the server metadata model to the settings and context data in each of the plurality of client metadata models;

transforming the server instance of the software application into each of the plurality of client instances of the software application, wherein a first one of the plurality of client instances is specific to a first client environment, wherein a second one of the plurality of client instances is specific to a second, different, client environment, and wherein each of the plurality of client instances provides corresponding functionality in each environment, and wherein transforming the server instance of the software application into each of the plurality of client instance of the software comprises:

replacing the server instantiation of the stereotyped interfaces with a client instantiation of the stereotyped interfaces;

replacing the plurality of components specified in the server metadata model with the plurality of components specified in the plurality of client metadata models to which they are mapped; and replacing the settings and context data specified in the server metadata model with the settings and context data specified in the plurality of client metadata models to which they are mapped.

2. The method of claim 1 wherein creating the plurality of client instances further comprises:

eliminating one or more components from each of the plurality of client instances of the software application which are specified in the server metadata model but are not mapped to respective ones of the plurality of client metadata models.

3. The method of claim 1, wherein each of the plurality of data sources is specific to a particular client environment.

4. The method of claim 1, wherein creating the plurality of client instances further comprises:

adding one or more components to each of the plurality of client instances of the software application which are specified in respective ones of the plurality of client metadata models but are not mapped from the server metadata model.

5. The method of claim 1, further comprising a client manifest which specifies that the plurality of components comprises the software application in the client environment.

6. The method of claim 5, wherein the client manifest specifies components which are not specified in a server configuration file.

7. The method of claim 6, wherein one of the components which are not specified in the server configuration file is a subscription to a data source.

8. The method of claim 1, wherein the metadata model further comprises a plurality of settings which specify behavior of the software application that is specific to at least one of the client environment or the server environment.

9. A computer system comprising:

one or more processors; and a memory coupled to the one or more processors, the memory for storing instructions which, when executed by the one or more processors, cause the one or more processors to perform a method for transforming a software application from a server environment to a client environment, the method comprising:

providing an entity model which defines a plurality of data sources;

providing an application programming interface comprising stereotyped interfaces to the plurality of data sources defined by the entity model;

creating a server instance of the software application comprising one or more components, at least one of which accesses data stored in the plurality of data sources by utilizing a server instantiation of the stereotyped interfaces;

creating a server metadata model of the server instance of the software application, the server metadata model comprising at least one setting to which the at least one component of the server instance of the software application is responsive;

creating a plurality of client metadata models for a plurality of client instances of the software application, each of the plurality of the client metadata models comprising:

mapping the one or more components in the server metadata model to one or more components in each of the client metadata models;

providing at least one setting to which at least one component of a client application will be responsive; and mapping the at least one setting in the server metadata model to the at least one setting in each of the plurality of client metadata models;

transforming the server instance of the software application into each of the plurality of client instances of the software application, wherein a first one of the plurality of client instances is specific to a first client environment, wherein a second one of the plurality of client instances is specific to a second, different, client environment, wherein each of the plurality of client instances provides corresponding functionality in each environment, and wherein transforming the server instance of the software application into each of the plurality of client instances of the software comprises replacing the server instantiation of the stereotyped interfaces with a client instantiation of the stereotyped interfaces.

10. The computer system of claim 9, wherein creating the plurality of client instances further comprises:

eliminating one or more components from each of the plurality of client instances of the software application which are specified in the server metadata model but are not mapped to respective ones of the plurality of client metadata models.

11. The computer system of claim 9, wherein creating the plurality of client instances further comprises:
adding one or more components to each of the plurality of client instances of the software application which are specified in respective ones of the plurality of client metadata models but are not mapped from the server metadata model.

12. The computer system of claim 9, wherein the mapping comprises connecting the at least one setting in the server metadata model to at least one setting that is substantially identical in a client metadata model.

13. The computer system of claim 9, wherein the mapping comprises connecting the at least one setting in the server metadata model to at least one setting that is substantially different in a client metadata model.

14. The computer system of claim 13, wherein the at least one setting that is substantially different comprises user specified data.

15. The computer system of claim 9, wherein the mapping specifies a setting in the client environment that does not exist in the server environment.

16. A computer storage device not consisting of a propagated signal and having computer-readable instructions stored thereon that when executed by a processing unit cause a computer system to perform a method of transforming a software application from a server environment to a client environment, the method comprising:
providing an entity model which defines a plurality of data sources;
providing an application programming interface comprising stereotyped interfaces to the plurality of data sources defined by the entity model;
creating a server instance of the software application comprising a plurality of components, at least one of which accesses data stored in the plurality of data sources by utilizing a server instantiation of the stereotyped interfaces;
creating a server metadata model of the server instance of the software application, the server metadata model comprising context data to which the at least one component of the server instance of the software application is responsive;
creating a plurality of client metadata models for a plurality of client instances of the software application, each of the plurality of the client metadata models comprising:
mapping the plurality of components in the server metadata model to a plurality of components in each of the client metadata models;
providing context data to which at least one component of a client application will be responsive; and
mapping the context data in the server metadata model to the context data in each of the plurality of client metadata models;
transforming the server instance of the software application into each of the plurality of client instances of the software application, wherein a first one of the plurality of client instances is specific to a first client environment, wherein a second one of the plurality of client instances is specific to a second, different, client environment, and wherein each of the plurality of client instances provides corresponding functionality in each environment, and wherein transforming the server instance of the software application into each of the plurality of client instances of the software comprises replacing the server instantiation of the stereotyped interfaces with a client instantiation of the stereotyped interfaces.

17. The computer storage device of claim 16, wherein each of the plurality of data sources is specific to a particular client environment.

18. The computer storage device of claim 16, wherein creating the plurality of client instances further comprises:
adding one or more components to each of the plurality of client instances of the software application which are specified in respective ones of the plurality of client metadata models but are not mapped from the server metadata model.

19. The computer storage device of claim 16, wherein creating the plurality of client instances further comprises:
eliminating one or more components from each of the plurality of client instances of the software application which are specified in the server metadata model but are not mapped to respective ones of the plurality of client metadata models.

20. The computer storage device of claim 16, wherein transforming the server instance of the software application into each of the plurality of client instance of the software comprises:
replacing the plurality of components specified in the server metadata model with the plurality of components specified in the plurality of client metadata models to which they are mapped; and
replacing the context data specified in the server metadata model with the context data specified in the plurality of client metadata models to which they are mapped.

* * * * *